INVENTOR.
JOSEPH H. SCHLESSEL

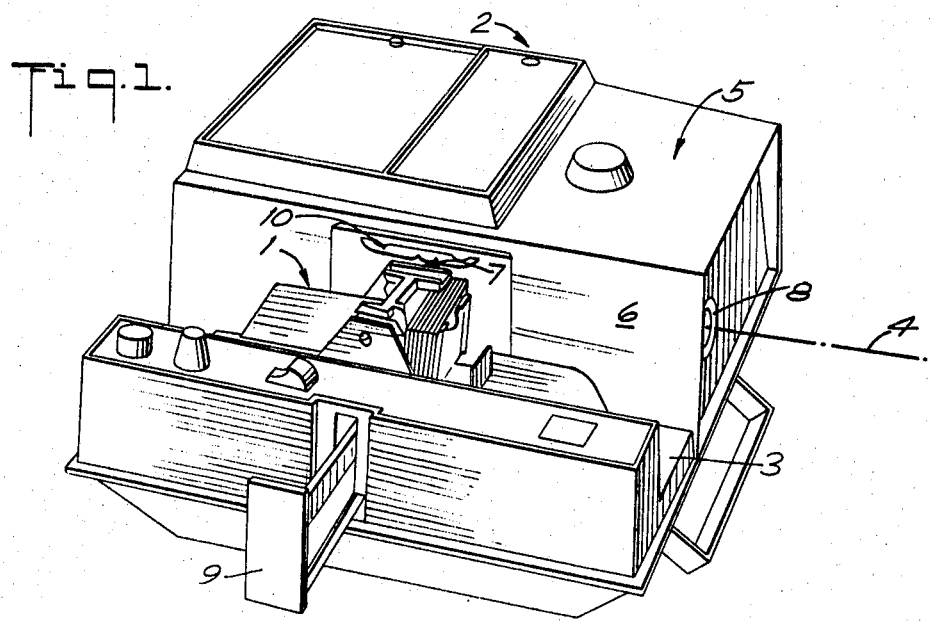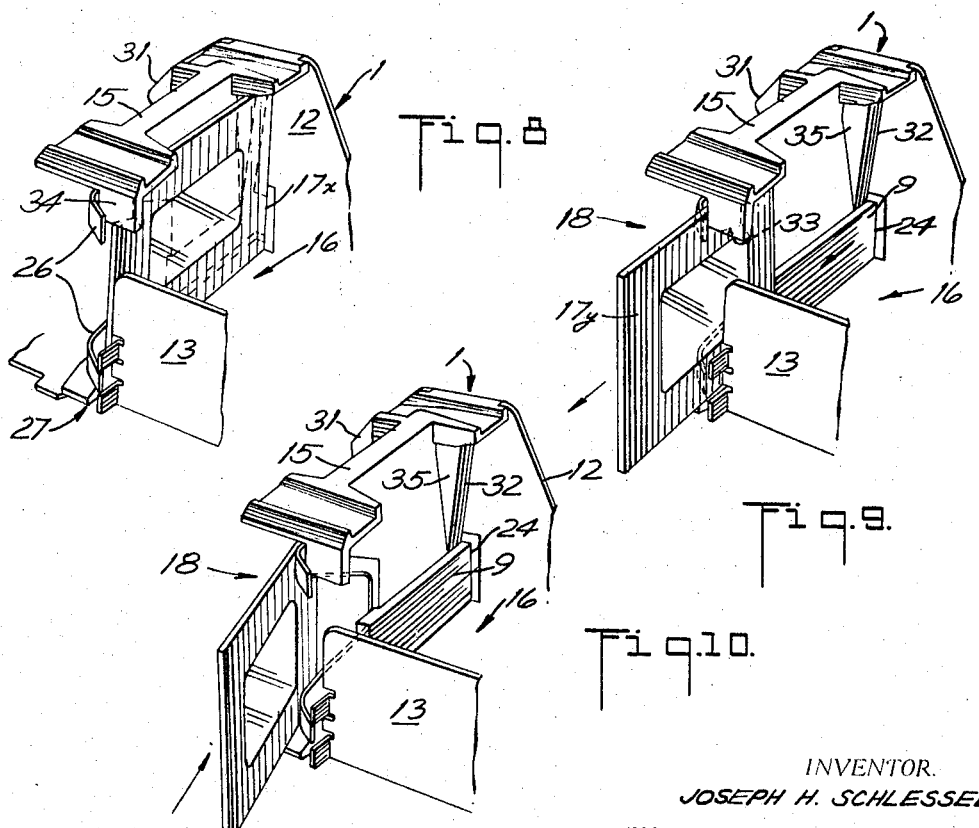

ATTORNEY

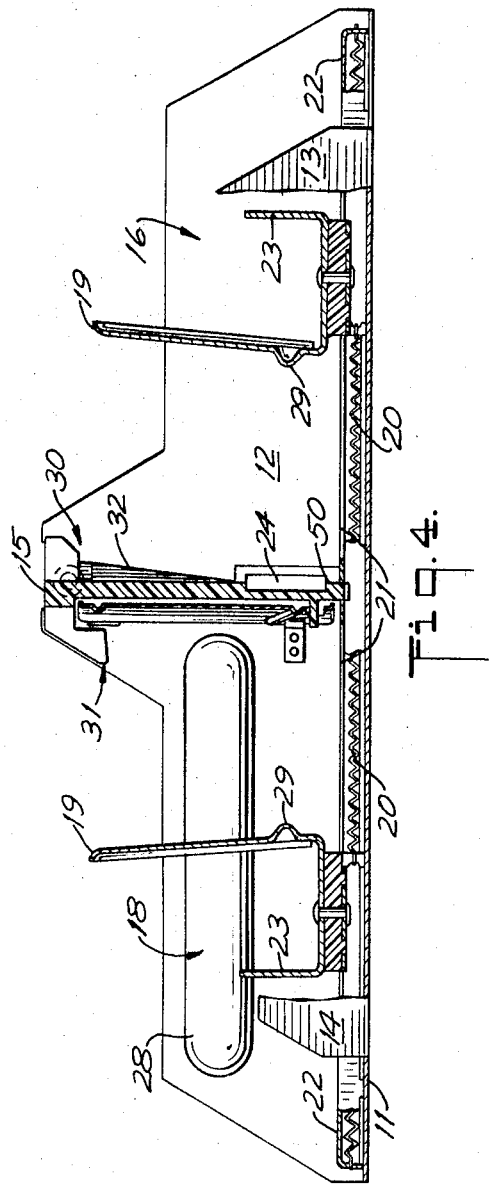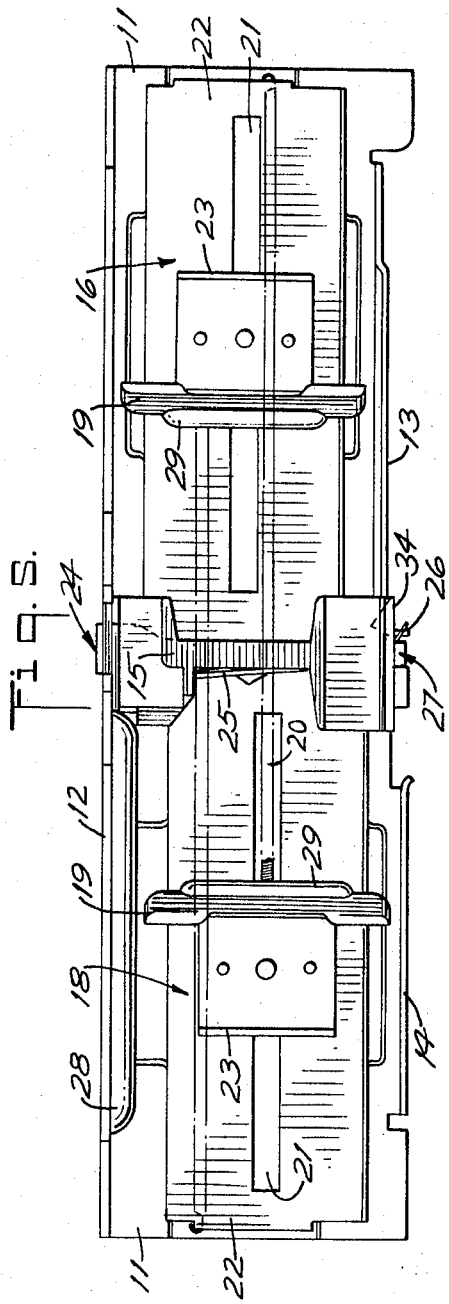

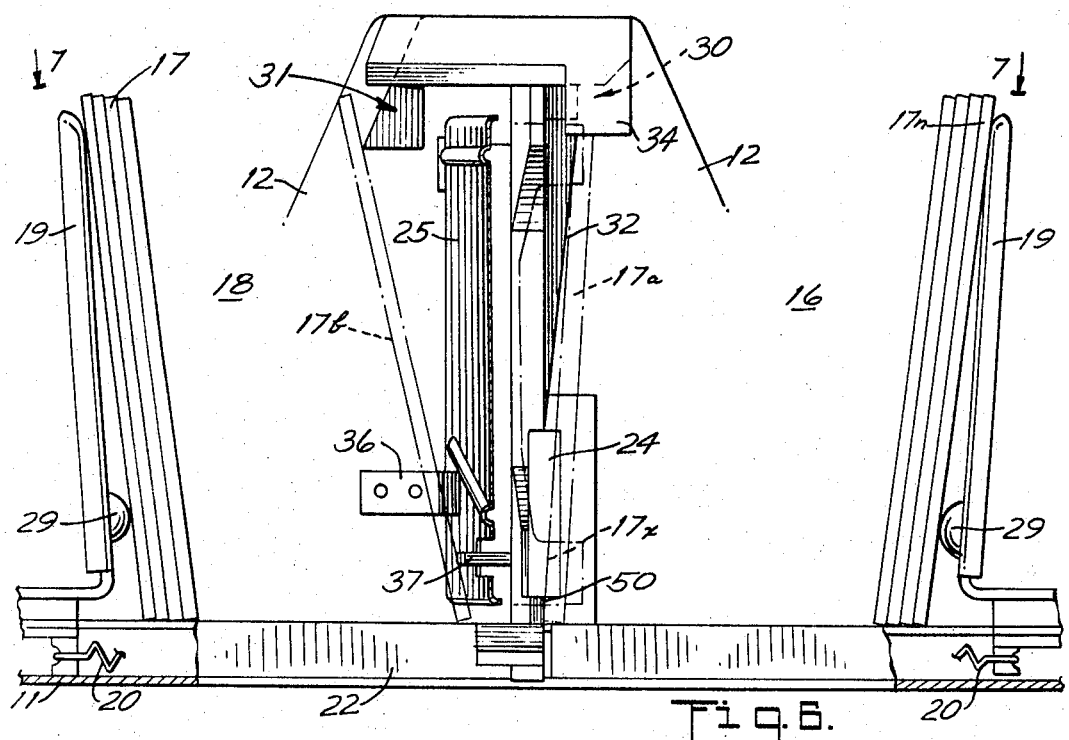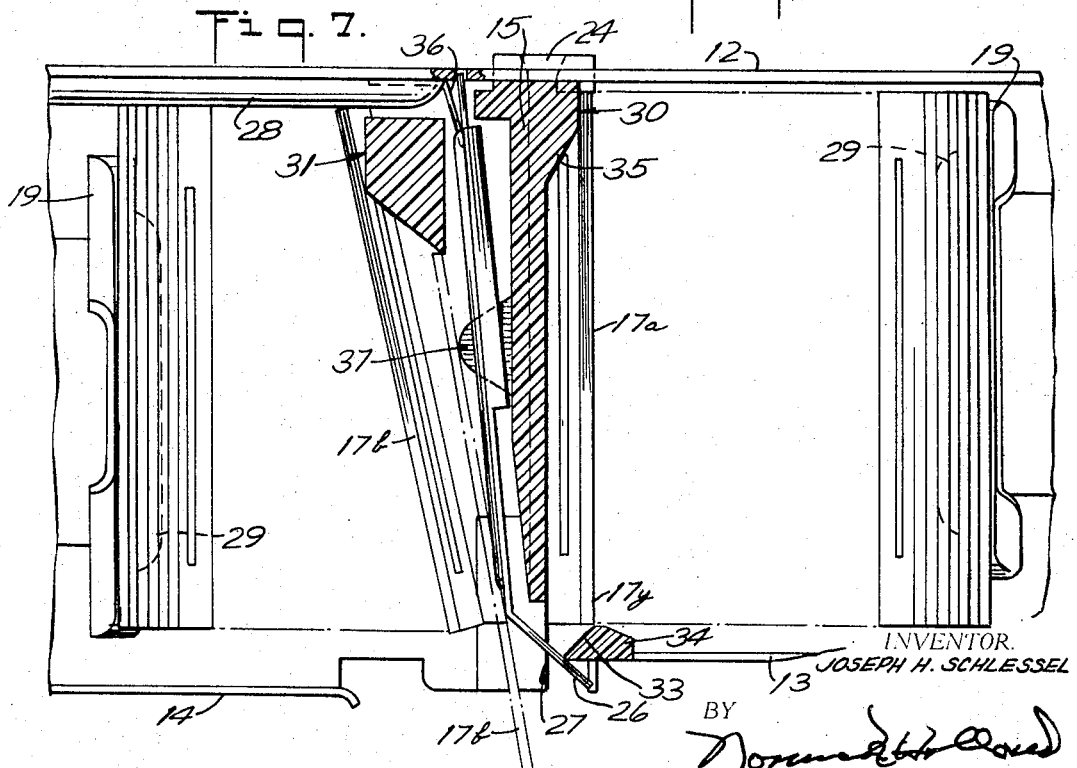

United States Patent Office 3,453,044
Patented July 1, 1969

3,453,044
MAGAZINELESS SLIDE CHANGER
Joseph H. Schlessel, Great Neck, N.Y., assignor to Airequipt Inc., New Rochelle, N.Y., a corporation of New York
Filed Jan. 23, 1967, Ser. No. 611,074
Int. Cl. G03b 23/04
U.S. Cl. 353—116                                    5 Claims

ABSTRACT OF THE DISCLOSURE

A tray which accepts a stack of photographic slides of various thicknesses and is capable of feeding them to a conventional projector in place of the usual compartmentalized magazine. The tray is in the form of a channel with a central partition which divides it into a section for accepting the stack of slides to be viewed and a section for taking up the slides after viewing. A spring loaded pusher plate in each section holds the slides in position against the partition. To permit the mixing of slides of various thickness in the tray, the stacks are tilted slightly away from the partition by projections on the lower part of the pusher plates and the upper part of the partition so that the lower portion of the foremost slide in the feed section extends only partly across an aperture in the side wall of the tray. The injection lever passing through the aperture engages only the side of the leading edge of the slide and as it moves across the tray the slide is pivoted forward and away from the surface of the following slide in order to reduce rubbing and wear between them. In order to return the slide to the takeup section of the tray upon removal from the receiving slot a spring loaded gate plate is positioned on the takeup side of the partition with fingers extending across the slide transfer path. The gate yields to permit the slide to enter the receiving slot and snaps back to a position to guide the slide into the takeup section upon withdrawal.

Introduction

The present invention relates to a tray for feeding photographic slides to a conventional slide projector and particularly a tray which will accept a stack of slides of varying thicknesses and may be used in place of the usual compartmentalized magazine to feed a photographic slide projector of the type having a parallel platform adjacent the projection axis.

Most slide projectors of the type having a parallel platform adjacent the projection axis presently use box-type and circular magazines having individual compartments for holding the slides to be fed to the projector for viewing. Before using magazines of this type it is necessary to sort the slides and individually handle them for insertion into the slide receiving compartments. After viewing they may be stored in the inserted order in the magazines and are readily available for future use. Generally, these magazines accept only slides of the same thickness.

However, at times it is desirable to show a number of unsorted or random slides and of different thicknesses in this type of projector. It then becomes necessary to insert each slide manually into an empty magazine and perhaps to remove slides already stored therein. If the thicknesses of the slides differ it may be necessary to insert each slide manually directly into the slide receiving slot in the side of the projector. This often proves very inconvenient and the present invention is designed to provide a slide holding device or tray which will receive a stack of unseparated slides of various thicknesses and may be used instead of the conventional compartmentalized magazines for feeding the random slides to conventional projector of the type mentioned above.

In addition this tray improves upon known types of magazineless stack loaded slide changers by providing a changing means which handles slides of varying thicknesses and which moves the slides including paper mounted slides to and from the viewing position with negligible wear and with minimal sliding contact between the slide surfaces. This is accomplished by an improved design featuring a divider partition in the tray having a combination of guide surfaces thereon.

This improvement makes the tray useful with a variety of slide mounts and permits such mounts to be intermixed in a slide showing which is not possible with the ordinary magazine or stack loaded slide changers and comparatively free from wear.

It is therefore an object of the present invention to provide a slide tray which facilitates the viewing of unsorted slides by eliminating the need for individual handling.

Another object of the present invention is to provide a slide tray which permits stack loading in connection with conventional projectors of the type having a parallel platform adjacent the projection axis.

Another object of the present invention is to provide a slide tray adapted for use with slide mounts of varying types and thicknesses and which handles such slide mounts including paperboard mounts with minimum wear.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view of a preferred embodiment of the stack loaded slide tray of the present invention in operative position in a slide projector;

FIG. 4 is a partially sectioned side view of the slide tray of the present invention;

FIG. 5 is a top view of the slide tray of the present invention;

FIG. 6 is a view of the slide tray of the present invention taken along lines 6—6 of FIG. 3;

FIG. 7 is a view of the slide tray of the present invention taken along lines 7—7 of FIG. 6;

FIG. 8 is a perspective view of the divider partition portion of the slide tray of the present invention with a slide in position for insertion into the projector;

FIG. 9 is a view as in FIG. 8 showing the slide injection lever moving the slide for insertion into the projector;

FIG. 10 is a view as in FIG. 8 showing the slide being returned to the tray.

Detailed description of the invention

Figure 2:
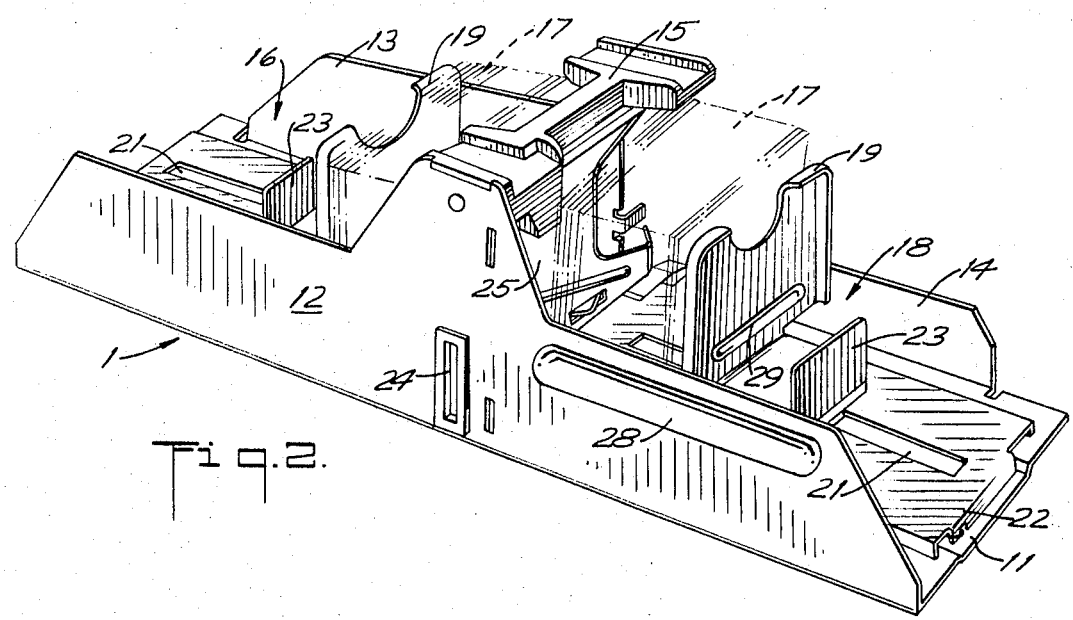
FIG. 2 is a perspective view of a preferred embodiment of the slide tray of the present invention.

Referring first to FIG. 1 the stack loaded slide tray 1 of the present invention is shown mounted in place in a slide projector 2 of the type having a parallel platform 3 adjacent the projection axis 4. As seen in FIG. 1 a projector of this type has two sections, one comprising an optical system contained within a housing 5 and the other an adjacent platform section which accommodates the means for feeding slides to the optical system. The axis 4 of the optical system is parallel to and just within the side wall 6 of the housing 5 and a slot 7 is provided in the housing 5 to permit slides to be inserted into the optical axis 4 and so that their images are projected through the front objective lens 8. A slide transfer lever 9 is used to insert and withdraw slides from the viewing position on the optical axis 4 of the projector through the slide receiving slot 7 in the side wall 6 of the projector.

The various means of feeding the photographic slides to and through the slide receiving slot 7 have greatly concerned the workers in this art from the standpoint of convenience, efficiency and facility of operation. The most common method of feeding slides to this slot 7 is the use of compartmentalized magazines. Each slide is individually inserted in a compartment in a box-like or annular magazine and the magazine is respectively advanced or rotated past the slot 7. The bracket 10 is provided above the slot 7 for mounting the annular or rotary type magazines.

As each successive compartment moves adjacent the slot 7 the transfer lever 9 is passed through it from the outside and pushes the slide into the slot 7 to a slide receiving bracket on the optical axis 4. The opposite stroke of the transfer lever 9 withdraws the slide through the slot 7 into its compartment in the magazine. The magazine is then advanced by means of a pinion (not shown) on the platform 3 cooperating with a rack on the magazine to present the next compartment adjacent the slot 7. In this manner a successive group of slides may be projected with a minimum amount of handling after the initial sorting. However, the use of these compartmentalized magazines does require that each individual slide be manually sorted and inserted in its respective compartment.

The tray 1 of the present invention is designed to be used in place of such compartmentalized magazines when it is desired to view a stack of photographic slides without taking the trouble to insert them individually into compartments. It is also possible with the tray to mix slides of various thicknesses which ordinarily cannot be done with the compartmentalized magazines as the compartments are generally all of a standard size within a given magazine.

Figure 3:
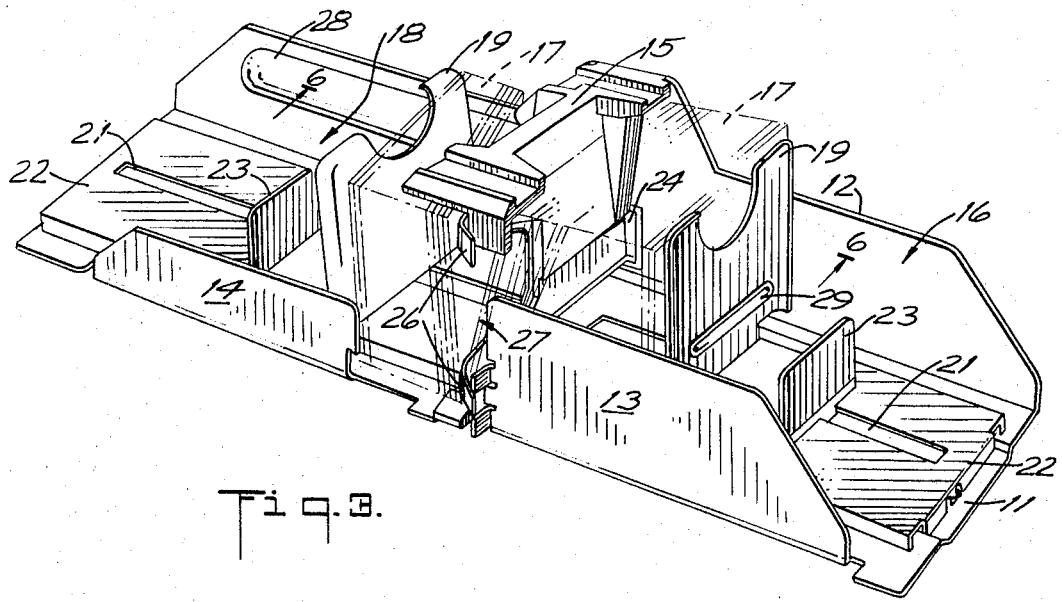
FIG. 3 is a perspective view of the slide tray of the present invention taken from the opposite side as that in FIG. 2.

A preferred embodiment of the improved tray 1 of the present invention is shown in detail in FIGS. 2 through 5. It is channel-like in construction having a floor or crosspiece 11 with a single outside wall 12 and two smaller inner side walls 13 and 14. A partition 15 divides the tray 1 into a section 16 for receiving the slides 17 for feeding to the projector and a section 18 for taking up the slides 17 after they have been shown. A pusher plate 19 held by a spring 20 is provided in each section 16 and 18 to hold the slides 17 in position against the divider partition 15. The pusher plates 19 ride in the slots 21 provided in the platform pieces 22 attached to the floor 11 of the tray 1. Hand grips or handles 23 are attached to the rear of the plates 19 to permit them to be manually withdrawn against the action of the springs 20 to permit the stack of slides 17 to be inserted in the feed section 16 or taken out of the takeup section 18.

A slot 24 is provided in the lower part of the outside wall 12 adjacent the divider partition 15 in the feed section 16 through which the projector transfer lever 9 passes for inserting the foremost slide through the slide receiving slot 7 in the projector 2. A gate plate 25 is located adjacent the partition 15 in the takeup section 18 and has bent fingers 26 which extend across the exit opening 27 in the feed section. This exit opening 27 will be positioned adjacent the slide receiving slot 7 of the projector 2 and is located directly opposite the aprture 24 in side wall 12 through which the slide transfer lever 9 passes.

As best seen in FIG. 5 the longitudinal axis of the feed section 16 and takeup section 18 is somewhat displaced so that a portion 28 of the side wall 12 in the takeup section 18 is indented to compensate for the displacement and maintain the same width in each section.

The divider partition 15 is particularly designed to obviate two difficulties which arise in the slide changing art. These difficulties are the mixing of slides having different thicknesses and the wear which results from the surface to surface friction between the two abutting slides having relative movement during the changing operation. In order to overcome these two problems the slides 17 are held in the tray 1 in a tilted orientation away from the divider partition 15 as best seen in FIG. 6. This tilting is achieved by providing a projection 29 on the lower part of the pusher plates 19 and appropriate projecting surfaces 30 and 31 on the upper part of the divider partition 15. The purpose and advantage gained from this tilting will be explained in the following discussion.

Firstly, with regard to the feed section 16, an inclined wall 32 is provided on the divider partition 15 adjacent the outside wall 12 of the tray 1 and above the slide transfer lever aperture 24. The foremost slide 17a in the stack will be pressed against the inclined surface of this wall 32. The rearmost slide 17n in the stack will have its lowermost portion pushed forward by the projection 29 on the pusher plate 19. This compressing action between the inclined wall 32 and the pusher plate 19 will tilt the entire stack somewhat away from the divider partition 15 with the lower edge of the foremost slide 17a abutting the foot 50 of the partition beneath the transfer lever aperture 24. The foremost slide 17a in this orientation as seen in FIG. 6 will have the side of its lower portion 17x extending only partly across the transfer lever aperture 24 in the side wall 12. The transfer lever 9 when passing through this opening 24 will therefore engage only the forward lower part 17x of the side of the foremost slide 17a. It will thus be seen upon consideration that the thickness of the slide is not critical as long as it has a minimum width which will not permit the lower portion of the following slide to extend into the opening 24. If the following silde does appear in the opening 24, the two slides would be engaged by the slide transfer lever 9 and delivered together to the slide receiving slot 7 in the projector 2. The minimum slide thickness to be handled may be determined by the width of the foot 50 beneath the transfer lever aperture 24. Thus, slides of various thicknesses may be included in the feed stack without requiring any special sorting. They will be fed to the projector 2 in the stacked order by the slide transfer lever 9 during normal operation.

The problem of wear which results from the surface to surface friction between the abutting foremost slide and the following slide during the changing operation is overcome by a further improved design of the divider partition 15 as best seen in FIGS. 6 and 7. As the foremost slide 17a is moved across the tray 1 toward the slot 7 in the projector 2 its upper forward edge 17y engages an inclined surface 33 on an overhanging projection 34 on the divider partition 15. As the upper edge 17y rides along this surface 33 during the transverse movement of the slide 17a, the slide is caused by this action to pivot forward about its lower edge and moves away from the surface of the following slide in the stack. At the same time the rear edge of the slide rides on a second inclined surface 35 on the divider partition 15 formed adjacent the inclined abutment wall 32. The foremost slide 17a is thus seen to be moved forward and into a vertical orientation by the action of these two surfaces and avoids sliding contact with the following slide as it is moved toward the exit opening 27 in the tray 1. The action of the pusher plate 19 on the slide stack moves the following slide into position against the abutment wall 32 as the rear edge of the foremost slide 17a rides along the inclined surface 34 on the divider partion 15. The combination then of the tilting of the slides 17 away from the divider partition 15 in the tray 1 and the action of the inclined surfaces 32, 33 and 35 of the divider partition 15 on the moving slide thus prevents the surface to surface friction and accompanying wear on the surface of adjacent slides during the changing operation.

The placing of a slide in the takeup section 18 of the tray 1 upon withdrawal from the projecting position is achieved by the use of a gate plate 25 also best seen in FIGS. 6 and 7. The gate plate 25 is mounted adjacent to the divider partition 15 in the takeup section 18. It is held by a spring 36 at one end and has two angled projecting fingers 26 at the opposite end extending across the exit opening 27 in the tray 1 through which the slides must pass during injection into the projector slot 7. As the slide 17a is moved through the opening 27 it pushes against the gate plate finger 26 and forces the plate 25 back against the action of the spring 36. The plate 25 moves back sufficiently to remove the projecting fingers 26 from the exit opening 27 and permit the slide to pass into the projector slot 7. When the slide has passed, the fingers 26 are moved back across the exit opening 27 by the action of the spring 36 on the plate 25. Upon withdrawal of the slide its rear edge engages the angled fingers 26 and the slide is guided as it moves to the takeup side 18 of the divider partition 15. A projecting cam surface 37 is provided on the lower face of the divider partition 15 in the takeup section 18. The lower surface of the slide engages and is further guided by this projection 37 into position as it moves across the tray 1. As the slide 17b reaches the opposite side of the tray its upper edge is engaged by another projecting surface 31 on the upper part of the divider partition 15. The action of this surface 31 tends to tilt the slide 17b away from the partition 15. As the slide passes along this projection 31 it is abutted on its opposite surface by the pusher plate 19 which holds it securely in place in the takeup section 18. Since the action of the slide transfer lever 9 on the slides being withdrawn from the slot 7 is discontinued immediately after withdrawal, the slide 17b does not reach the opposite wall 12 of the tray 1 and would therefore not be securely held in the takeup section. To correct for this condition a protruding portion 28 is formed in the opposite side wall 12 in this section 18. The slide 17b upon withdrawal then will move across the tray 1 until its rear edge abuts the protrusion 28 on the side wall 12 and its upper edge is held between the projecting surface 31 and the pusher plate 19. The pusher plate 19 in the takeup section 18 exerts less pressure on the slides than the one in the feed section in order to facilitate the acceptance of the withdrawn slide.

In summary, the operative steps in the ejection and return of the slide to the tray are illustrated in FIGS. 8, 9, and 10. In FIG. 8 the foremost slide is shown in tilted position in the feed section prior to the ejection operation. In FIG. 9 the transfer lever 9 is shown passing through the aperture 24 in the side wall 12, engaging the lower edge of the slide and pushing the slide across the tray 1 through the exit opening 27. The action of the slide against the surfaces 32, 33, and 35 erects and advances the slide away from the surface of the following slide in the stack. The fingers 26 on the gate plate 25 are shown moved out of the opening 27 by the pressure of the passing slide. In FIG. 10 as the slide is being withdrawn from the slot the gate plate fingers 26 have snapped back across the opening 27 and the slide is guided by their inclined surfaces into the takeup section 18 of the tray 1. It is then held therein between the pusher plate and the projecting surface 31 on the divider partition 15.

It will thus be seen that an improved slide tray is provided which will accept stacks of photographic slides of various thicknesses and is capable of feeding them to a conventional projector in place of the usual compartmentalized magazine and in so doing avoids the usual surface to surface friction between the successive slides which occurs in other stack loaded slide changers.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A tray for photographic slides for use in a slide projector having a slide transfer member for moving slides to and from the tray comprising the combination of partition means on said tray dividing it into two sections, pressure means in each section for holding a stack of slides therein against said partition, means on said pressure means cooperating with first means on said partition for tilting the slides held between them away from said partition, a clearance on one side of said tray which permits the passage of said transfer member for engaging the lower edge of the slide held in abutting relation with said partition and for moving said slide transversely of said tray, and second means on said partition for erecting and directing said slide during its movement across the tray for insertion into the slide receiving slot of a projector, and means for guiding the slide which has been inserted into the projector back into said tray.

2. A tray as claimed in claim 1 in which said means for guiding the slide comprises a gate member positioned transversely of the longitudinal axis of the tray and adjacent to said partition means for guiding the slide from the projector back into said tray.

3. A tray as claimed in claim 1 in which said means for guiding the slide comprises a gate member positioned transversely of the longitudinal axis of the tray and adjacent to said partition means for guiding slides from the projector to the tray, and which further comprises projecting means on said partition means.

4. A tray as claimed in claim 1 in which the means for erecting and directing the foremost slide is positioned above the level of said clearance.

5. A tray for feeding a stack of photographic slides to a projector having a slide moving member comprising the combination of a base member, upstanding side pieces on said base member, partition means on said base member dividing it into two sections, pressure means in each section for holding a stack of slides therein, a first projection on said partition having a first inclined surface against which the foremost slide of the stack is held by the action of said pressure means, a second projection on said pressure means cooperating with said first projection on said partition to tilt the slides held between the partition and pressure means away from said partition, an opening in one of said side pieces under said first projection to permit the passage of said slide moving member such that the lower edge of said foremost slide extends partially across said opening and is engaged by said slide moving member, a second inclined surface on said first projection adjacent said first inclined surface along which the engaged edge of said slide rides initially upon movement, and a third inclined surface which guides the edge of the slide opposite the engaged edge with the combination of the second and third inclined surfaces causing said slide to be erected and directed during its transverse movement for insertion into the slide receiving slot of the projector.

References Cited

UNITED STATES PATENTS

| 2,533,441 | 12/1950 | Estes | 40—79 X |
| 2,634,653 | 4/1953 | Barth | 40—79 X |
| 3,238,653 | 3/1966 | Wiklund | 40—79 |
| 3,258,867 | 7/1966 | Hall | 40—79 |

EUGENE R. CAPOZIO, *Primary Examiner.*

RICHARD CARTER, *Assistant Examiner.*